United States Patent [19]

Kawasaki et al.

[11] Patent Number: 5,778,146
[45] Date of Patent: Jul. 7, 1998

[54] LIGHT BEAM HEATING APPARATUS

[75] Inventors: Moriaki Kawasaki, Habikino; Tamotsu Ikeda, Toyonaka; Nobuyuki Haji, Osaka; Masayoshi Ueda, Ashiya, all of Japan

[73] Assignee: Matsushita Electric Industrial Co., Ltd., Osaka-fu, Japan

[21] Appl. No.: 552,475

[22] Filed: Nov. 9, 1995

[30] Foreign Application Priority Data

Nov. 15, 1994 [JP] Japan ................................. 6-280578

[51] Int. Cl.⁶ ..................................................... F21V 7/00
[52] U.S. Cl. .................... 392/419; 392/416; 219/85.12; 219/502; 250/205
[58] Field of Search .......................... 392/419, 420, 392/421, 422, 423, 416, 411–415; 219/85.12, 85.13, 498, 502, 121.63, 121.61; 250/201.4, 205, 227.11; 362/220, 285

[56] References Cited

U.S. PATENT DOCUMENTS 5,335,309  8/1994  Fujii et al. ............................ 392/421

*Primary Examiner*—Tu B. Hoang
*Attorney, Agent, or Firm*—Wenderoth, Lind & Ponack, L.L.P.

[57] ABSTRACT

In a light beam heating apparatus generating a light beam for heating a work, optical energy of the light beam is deteriorated as the lamp is used. The optical energy is controlled by detecting an optical intensity of the light emitted by the lamp. If the optical intensity is decided not to be increased to a desired value due to an increase in arc light source or the like, an exchange of the lamp is cautioned. Thus, a timing of the exchange of the lamp can be decided before the temperature of a work becomes lower than the desired value.

19 Claims, 4 Drawing Sheets

LIGHT BEAM HEATING APPARATUS

BACKGROUND OF THE INVENTION

1. Field of the Invention

The present invention relates to a light beam heating apparatus which heats a material locally with a light beam generated by condensing light emitted by a lamp.

2. Description of the Prior Art

A light beam heating apparatus is used as a non-contact local heating apparatus for various uses such as soldering of electronics parts, heating and fusing a resin material, and removing a coating of a polyurethane line. U.S. Pat. No. 5,335,309 of Fujii et al. describes such a light beam heating apparatus. The apparatus condenses light emitted from a lamp such as a Xenon lamp, transmits the condensed light through a flexible optical fiber, and focuses a light beam locally onto a target material in order to heat the material.

However, when the light beam heating apparatus is used for a long time, the performance of the apparatus deteriorates gradually. For example, a quantity of light emitted by the lamp varies based on use conditions of the lamp and based on the accumulated lighting time of the lamp. This change is mainly caused by evaporation of electrode metal provided in a bulb of the lamp. The evaporated atoms adhere to the inside of the bulb, and the bulb gradually loses transparency as the lamp is used. On the other hand, when an elliptic mirror is used to condense the light emitted by the lamp onto a light-receiving end of the optical fiber, the condensing performance of the mirror changes largely due to wear of the cathode electrode in the lamp. As the accumulated use time of the lamp increases, the wear of the electrode proceeds and broadens an arc light source near a cathode point. Then, the quality of the light condensed onto the light-receiving end of the optical fiber gradually decreases. The quality of light decreases even if the same current is supplied to the lamp.

The current supplied to the lamp for generating a light beam can be increased to compensate for the change in optical energy. However, the lamp has an upper limit, or a rated value, of the current value, which is determined by the size of the electrode or by internal heating in the lamp. A power supply cannot supply a current larger than the upper limit to the lamp. As the light source gradually wears, the current value needed for realizing a desired optical energy increases. At some point the current value cannot be increased any more and a light beam of the desired optical energy cannot be supplied.

Therefore, the lamp has to be changed before the current value needed for realizing a desired optical energy increases to a value which cannot be supplied by the power source. However, the degree of the lowering of the quantity of emitting light of the lamp differs since the light-emitting properties and use conditions differ from lamp to lamp. Therefore, it is difficult to change the lamp at the correct time.

SUMMARY OF THE INVENTION

An object of the present invention is to provide a light beam heating apparatus which can decide the correct time to change a lamp of a light source.

In the light beam heating apparatus of the present invention, a light source, including a lamp such as a Xenon lamp, emits a light, and an optical propagation means condenses the light so as to generate a light beam for irradiating a workpiece. In order to control a current supplied to the lamp, a controller compares a desired output power, set by a setter, with an output power detected by a detector at a light-receiving end of the optical propagation means. The controller sets a current, supplied from a power supply to the lamp, according to the comparison. The "output power" broadly refers to a quantity of heating irradiated by the beam, such as optical energy or temperature. The output power can be related to the temperature of the workpiece. Further, a reference current setter sets a reference current which is lower than a rated current of the lamp. A signal output means outputs a signal when the current value supplied by the power supply becomes larger than the reference current.

An advantage of the present invention is that the time at which the lamp is changed can be suitably determined.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
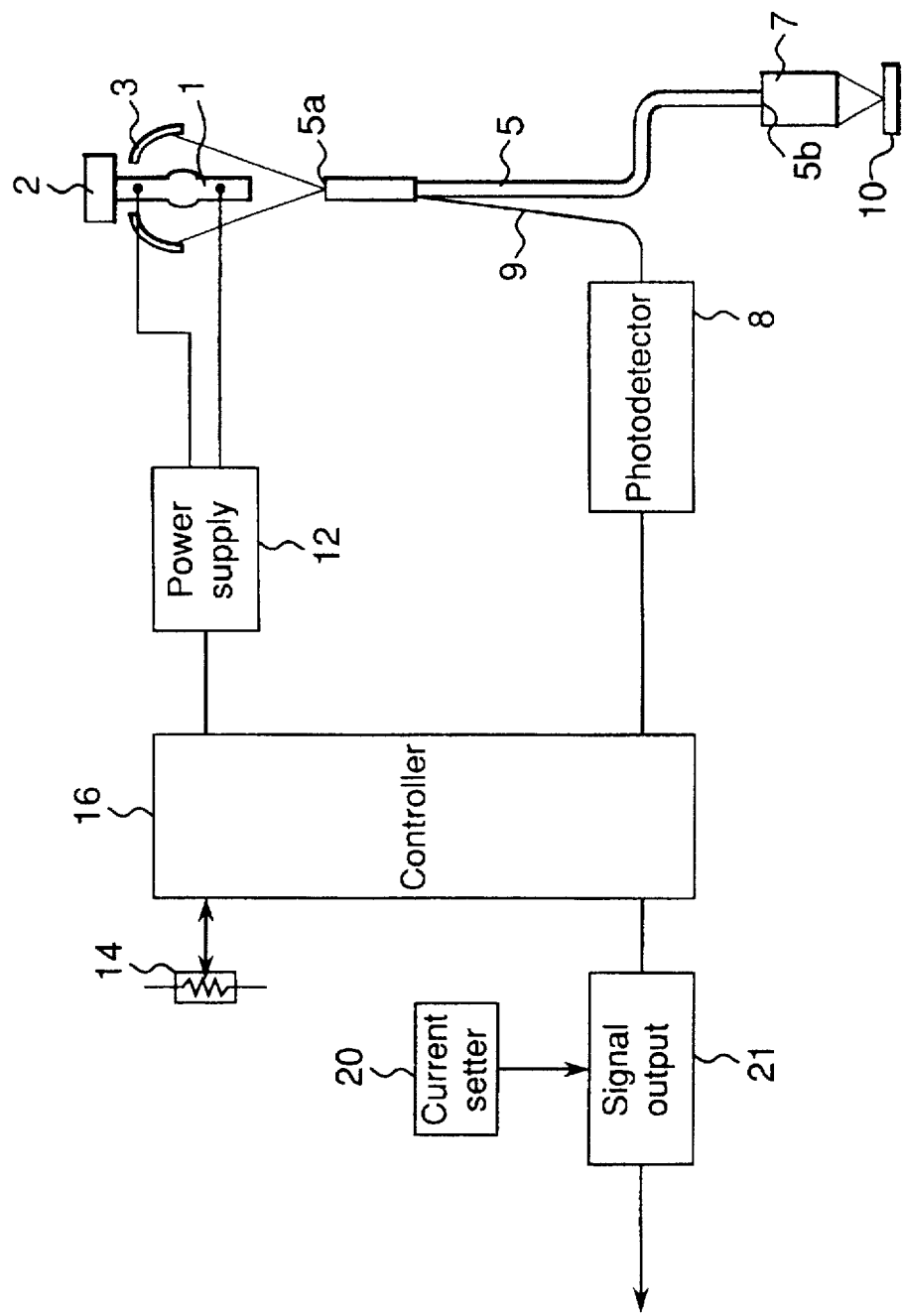
FIG. 1 is a diagram of a light beam heating apparatus of a first embodiment of the invention.

Referring now to the drawings, wherein like designate like reference characters designate like or corresponding parts throughout the several views, FIG. 1 shows a light beam heating apparatus according to a first embodiment of the invention. A lamp 1, such as a Xenon lamp, is mounted at a base 2 enclosed with an elliptical mirror 3 having a first focal point and a second focal point. A light emitting point of the lamp 1 is located at the first focal point of the elliptical mirror 3. An optical fiber 5 includes a bundle of hundreds of optical fiber elements. A light-receiving end 5a of the optical fiber 5 is fixed with a tool (not shown) at the second focal point of the elliptical mirror 3. A lens unit 7 includes a lens system for condensing light exiting another end 5b of the optical fiber 5 onto a workpiece 10.

A photodetector 8 includes a single optical fiber element 9 included in the optical fiber 5. A light-receiving end of the optical fiber element 9 is located at the center of the light-receiving end 5a of the optical fiber 5. The photodetector 8 converts the light received by the optical fiber element 9 to an electric signal and sends it to a controller 16. An output setter 14 sets a desired optical energy. The power controller 16 calculates the optical energy of the light beam from the optical intensity received from the photodetector 8 and sets a current value to be supplied by a power source 12 by comparing the calculated optical energy with the desired optical energy set by the output setter 14. For example, if the calculated optical energy is smaller than the desired optical energy set by the output setter 14, the current value is increased, whereas if the calculated optical energy is larger than the desired optical energy set by the output setter 14, the current value is decreased. The power supply 12 supplies a constant DC current to the lamp 1 in correspondence to the current level received from the controller 16.

A reference current setter 20 sets a reference current as a reference with respect to when to send an external warning signal. A signal generator 21 supplies such a signal when the current value set by the controller 16 exceeds the reference current set by the reference current setter 20.

Next, the operation of the light beam heating apparatus is explained. First, the lamp 1 is turned on by the power supply 12 with a constant lamp current. The lamp 1 then starts to emit light. Because the radiating point of the lamp 1 is located at a first focal point of the elliptical mirror 3, the emitted light is condensed at a second focal point, i.e., at the light receiving end 5a of the optical fiber 5. The condensed light is detected by the photodetector 8 located at the light receiving end 5a, and the output of the photodetector 8 is supplied to the controller 16.

The controller 16 calculates the optical energy of light entering the light-receiving end 5a of the optical fiber 5 and controls the current supplied by the power supply 12 so that the calculated optical energy becomes equal to the optical energy set by the output setter 14. Thus, the optical energy at the light-receiving end 5a becomes constant. The optical energy condensed at the light-receiving end 5a propagates through the optical fiber 5 and is emitted from the other end 5b of the optical fiber 5. Then, the light is condensed by the lens unit 7 so as to irradiate the workpiece 10. Because the total optical energy at the light-receiving end 5a is kept constant, the energy irradiating the workpiece also becomes constant.

As the accumulated lighting time of the lamp 1 increases, a quantity of light emitted by the lamp 1 decreases. As an electrode of the lamp 1 wears, an arc light source in the lamp 1 becomes large, and a condensing performance of the elliptical mirror 3 becomes lower. As this process occurs, the controller 16 increases the current value supplied to the lamp 1 so that the calculated optical energy, calculated by the controller 16, becomes equal to the optical energy set by the output setter 14.

The reference current setter 20 previously sets a current value which is a few amperes lower than an upper limit of the rated current to be supplied to the lamp 1. If the current supplied to the lamp 1 becomes equal to or exceeds a value set by the current setter 20, a signal is sent out of the apparatus by the signal output device 21 in order to provide a warning to the user that the lamp 1 needs to be changed. Therefore, the lamp can be efficiently changed at a suitable time.

In the above-mentioned embodiment, the photodetector 8 has a single optical fiber element 9 with its light-receiving end located at the light-receiving end 5a of the optical fiber 5. However, the position of the light-receiving end of the optical fiber element may be off the center of the light-receiving end of the optical fiber 5.

Figure 2:
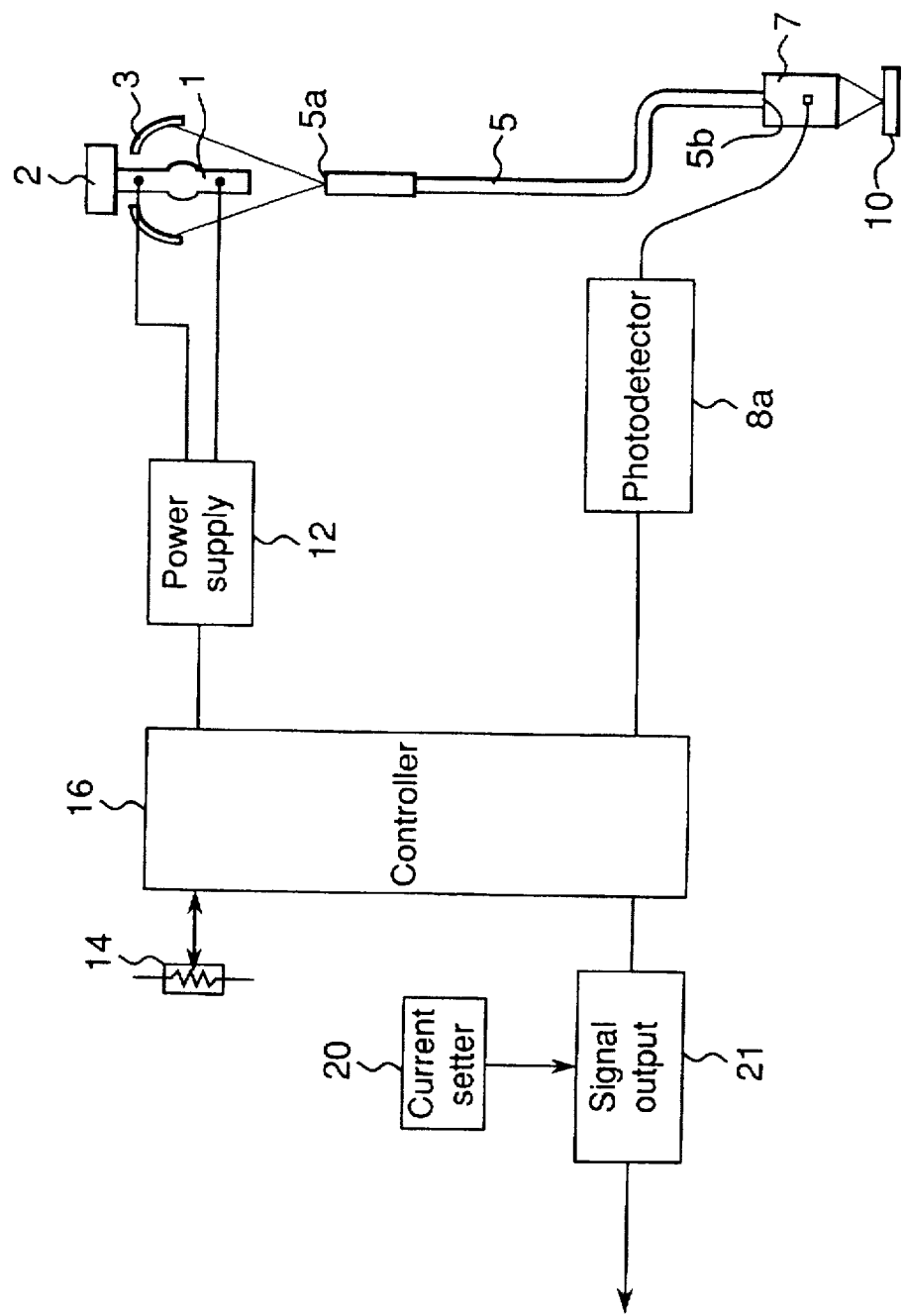
FIG. 2 is a diagram of a light beam heating apparatus of a second embodiment of the invention.

FIG. 2 shows a heating apparatus of a second embodiment of the invention. This apparatus is different from the first embodiment only in that a photodetector 8a detects light near the out-going end 5b of the optical fiber 5. For example, the photodetector 8a may include a sensor provided near the out-going end 5b of the optical fiber 5. In a different example, the photodetector 8a may have a single optical fiber with its light-receiving end located near the out-going end 5b of the optical fiber 5.

Figure 3:
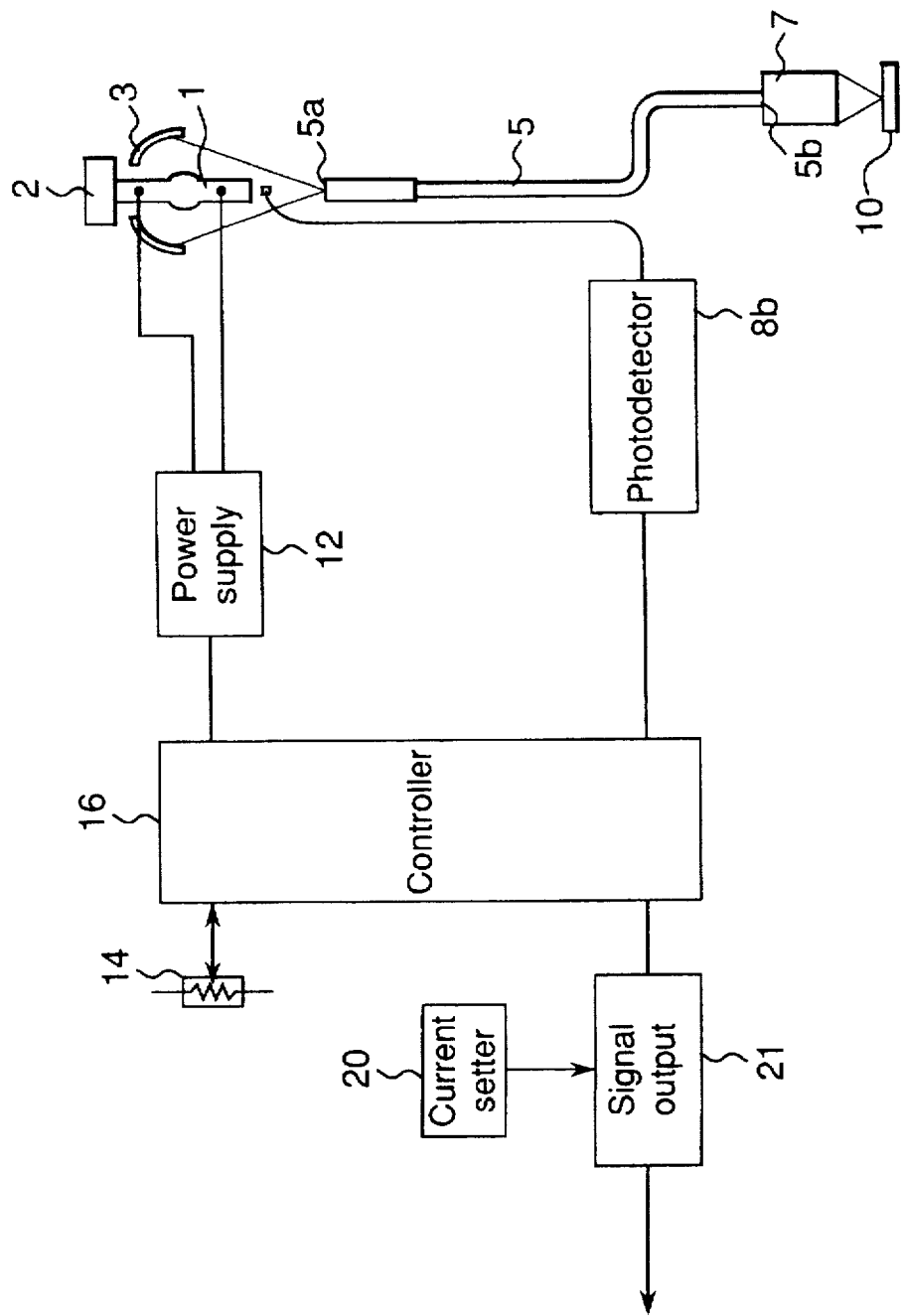
FIG. 3 is a diagram of a light beam heating apparatus of a third embodiment of the invention.

FIG. 3 shows a heating apparatus of a third embodiment of the invention. This apparatus is different from the previous embodiments only in that a photodetector 8b detects the condensing light near the light-receiving end 5a of the optical fiber 5. For example, the photodetector 8b may include a sensor provided near the light-receiving end 5a of the optical fiber 5. In a different example, the photodetector 8b may have a single optical fiber line with its light-receiving end in the condensing light near the light-receiving end 5a of the optical fiber 5.

The operation of the heating apparatuses shown in the FIGS. 2 and 3 is similar to that of the first embodiment. The photodetector 8a, 8b detects the optical intensity of the light beam at a position such as near the out-going end 5b of the optical fiber 5 (FIG. 2), or near the light-receiving end 5a of the optical fiber 5 (FIG. 3). The controller 16 calculates the current to be supplied to the power source so that the optical energy of the light, which is heating the workpiece 10, becomes constant. When the current supplied to the lamp 1 reaches or exceeds the value set by the current setter 20, the signal output device 21 supplies a signal in order to provide a warning to the user that the lamp 1 needs to be changed.

Figure 4:
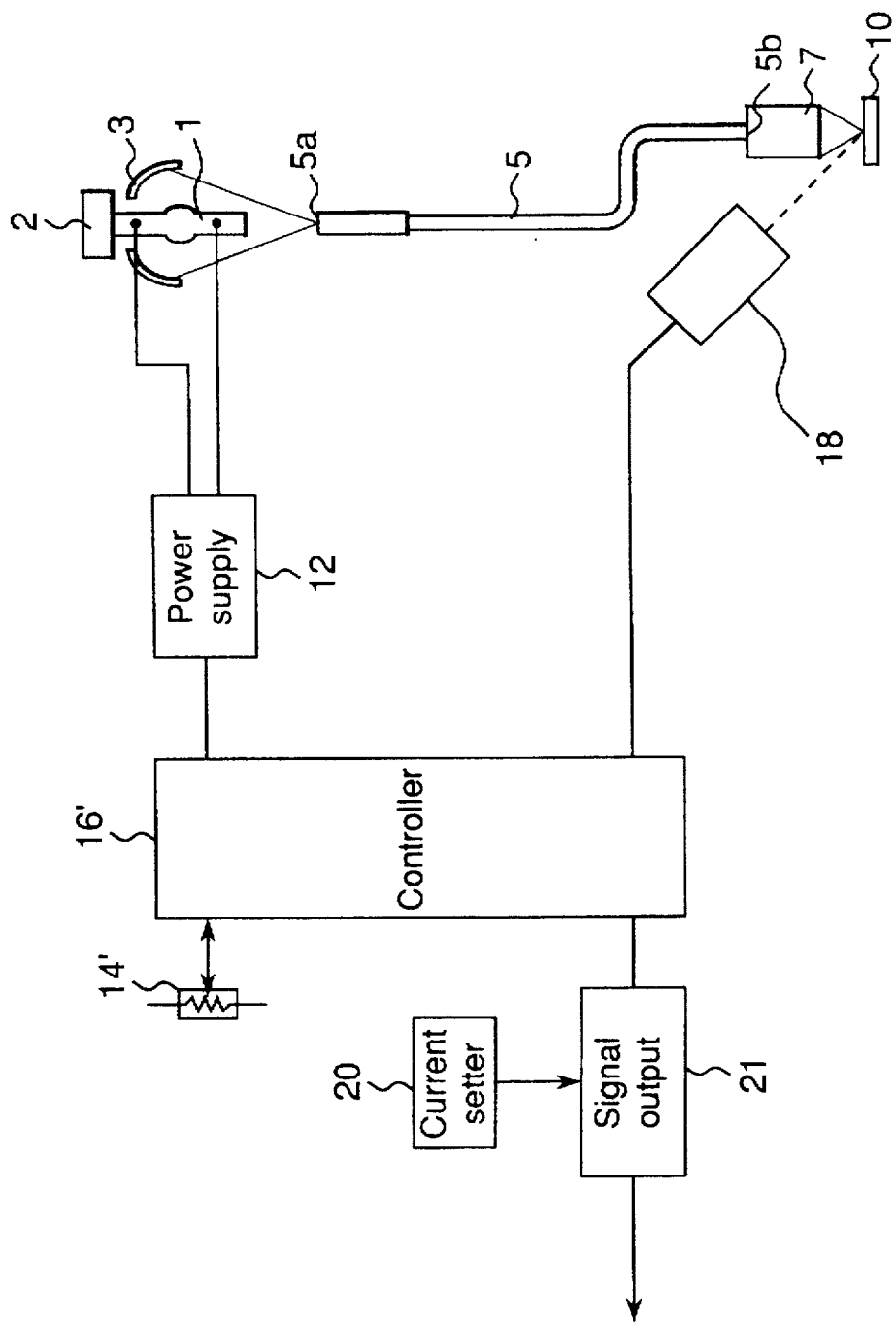
FIG. 4 is a diagram of a light beam heating apparatus of a fourth embodiment of the invention.

FIG. 4 shows a light beam heating apparatus of a fourth embodiment of the invention. In this embodiment, the temperature of a workpiece 10, heated by a light beam, is detected in order to control the current supplied to the lamp 1. The lamp 1 is mounted at a base 2 enclosed with an elliptical mirror 3 having a first focal point and a second focal point. A light emitting point of the lamp 1 is located at the first focal point of the elliptical mirror 3. An optical fiber 5 includes a bundle of hundreds of optical fiber elements. A light-receiving end 5a of the optical fiber 5 is fixed with a tool (not shown) at the second focal point of the elliptical mirror 3. A lens unit 7 includes a lens system for condensing a light going out from another end 5b of the optical fiber 5 onto the workpiece 10.

A temperature detector 18 includes a temperature sensor responsive to infrared rays, and a converter which converts the received light to an electric signal and amplifies it to a suitable level. The temperature detector 18 detects a temperature of the workpiece 10 which is heated by a light beam that is condensed by the lens unit 7. The temperature detector sends the detected temperature to a controller 16'.

A temperature setter 14' sets a desired heating temperature. The controller 16' calculates a current supplied to the lamp 1 so that the temperature detected by the temperature detector 18 becomes equal to the current set by the temperature setter 14' and sends the current value to a power supply 12. For example, if the detected temperature is lower than the temperature set by the temperature setter 14', the current value is increased, whereas if the detected temperature is higher than the desired temperature set by the temperature setter 14', the current value is decreased. The power supply 12 supplies a constant DC current to the lamp 1 in correspondence to the current value received from the controller 16'.

A current setter 20 sets a reference current value as a reference with respect to when to send an external warning signal. A signal generator 21 supplies such a signal when the current value set by the controller 16' exceeds the reference current set by the reference current setter 20.

Next, the operation of the light beam heating apparatus is explained. The generation of a light beam for heating the workpiece 10 is similar to that in the first embodiment. The lamp 1 is turned on by the power supply 12 with a constant lamp current. The lamp 1 then starts to emit light. Because the radiating point of the lamp 1 is located at a first focal point of the elliptical mirror 3, the generated light is condensed at a second focal point, i.e., at the light receiving end 5a of the optical fiber 5. The optical energy condensed at the light-receiving end 5a is emitted from the other end 5b of the optical fiber 5, and is condensed by the lens unit 7 so as to irradiate the workpiece 10.

The temperature detector 18 detects the temperature of the workpiece 10, which is heated locally with the laser beam. The temperature detector sends the value of the detected temperature to the controller 16'. The controller 16' controls the current supplied by the power supply 12 according to the detected temperature, so that the temperature of the workpiece 10 becomes constant.

As the lighting time of the lamp 1 is accumulated, the quantity of light emitted by the lamp 1 decreases. As an electrode of the lamp 1 wears, the arc light source in the lamp 1 becomes larger, and a condensing performance of the elliptical mirror 3 becomes lower. As this process occurs, the temperature of a focal point of the condensed light, or of the workpiece 10, detected by the temperature detector 18 decreases. Then, the controller 16' increases the current value supplied to the lamp 1 so that the detected temperature becomes equal to the temperature set by the temperature setter 14'.

Similarly to the first embodiment, the reference current setter 20 previously sets a current value which is a few amperes lower than an upper limit of the rated current to be supplied to the lamp 1. If the current supplied to the lamp 1 becomes equal to or exceeds a value set by the current setter 20, a signal is sent out of the apparatus by the signal output device 21 in order to provide a warning to a user. Therefore, the lamp can be efficiently changed at a suitable time.

As explained above, in the embodiments of the invention, the total energy of the light beam irradiating a workpiece can be kept constant, irrespective of the change in the optical intensity distribution due to wear of the electrode of the lamp. Further, a warning is given well before the current supplied to the lamp exceeds a rated current value of the lamp 1. Therefore, the time at which the lamp is to be changed can be suitably decided, and bad heating operations can be prevented.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A light beam heating apparatus comprising:

a light source including a lamp;

an optical propagation means for condensing light emitted by said light source and for generating a light beam for irradiating a workpiece;

an output power setter for setting an output power level of said optical propagation means;

a detector for detecting an actual output power of said optical propagation means;

a controller for setting a current value to be supplied to the lamp such that the actual output power detected by said detector becomes substantially equal in value to the output power level set by said output power setter;

a power supply which supplies a current to the lamp in correspondence to the current value set by said controller;

a reference current setter for setting a reference current lower than a rated current of the lamp; and a signal output means for outputting a signal when the current supplied by said power supply becomes larger than the reference current set by said reference current setter.

2. The apparatus according to claim 1, wherein said optical propagation means comprises an optical fiber which propagates light received from the lamp of said light source.

3. The apparatus according to claim 1, wherein said lamp of said light source is a Xenon lamp.

4. A light beam heating apparatus comprising:

a light source including a lamp;

an optical propagation means for condensing light emitted by said light source and for generating a light beam for irradiating a workpiece;

an output power setter for setting an optical energy level to be propagated by said optical propagation means;

a photodetector for detecting an actual optical energy of the light;

a controller for setting a current value to be supplied to the lamp based on a comparison of the actual optical energy detected by said photodetector with the optical energy level set by said output power setter;

a power supply which supplies a current to the lamp in correspondence to the current value set by said controller;

a reference current setter for setting a reference current lower than a rated current of the lamp; and a signal output means for outputting a signal when the current supplied by said power supply becomes larger than the reference current set by said reference current setter.

5. The apparatus according to claim 4, wherein said optical propagation means comprises an optical fiber which propagates the light received from the lamp of said light source.

6. The apparatus according to claim 4, wherein said lamp of said light source is a Xenon lamp.

7. The apparatus according to claim 4, wherein said optical propagation means comprises:

a condensing means for condensing the light emitted by said light source;

an optical fiber for receiving a light condensed by said condensing means; and a focusing means for focusing, onto the workpiece, a light exiting said optical fiber.

8. The apparatus according to claim 4, wherein said photodetector is operable to receive light emitted from an emitting end of said optical propagation means and to detect an optical intensity of the light emitted from said emitting end of said optical propagation means.

9. The apparatus according to claim 4, wherein said photodetector is operable to receive the light condensed by said optical propagation means and to detect an optical intensity of the light condensed by said optical propagation means.

10. The apparatus according to claim 4, wherein said optical propagation means comprises an optical fiber for receiving light emitted from said light source, and said photodetector is operable to receive light at a light-receiving end of said optical fiber and to detect an optical intensity of the light at said light-receiving end of said optical fiber.

11. The apparatus according to claim 10, wherein said photodetector is operable to receive light at a center of said light-receiving end of said optical fiber.

12. A light beam heating apparatus comprising:

a light source including a lamp;

an optical propagation means for condensing light emitted by said light source and for generating a light beam for irradiating a workpiece;

a temperature setter for setting a temperature level;

a temperature detector for detecting a temperature at a portion of the workpiece irradiated by the light beam generated by said optical propagation means;

a controller for setting a current value to be supplied to the lamp based on a comparison of the temperature level set by said temperature setter with the temperature detected by said temperature detector;

a power supply which supplies a current to the lamp in correspondence to the current value set by said controller;

a reference current setter for setting a reference current lower than a rated current of the lamp; and a signal output means for outputting a signal when the current supplied by said power supply becomes larger than the reference current set by said reference current setter.

13. The apparatus according to claim 12, wherein said optical propagation means comprises:

a condensing means for condensing the light emitted by said light source;

an optical fiber receiving a light condensed by said condensing means; and a focusing means for focusing, onto the workpiece, light exiting said optical fiber.

14. The apparatus according to claim 12, wherein said lamp of said light source is a Xenon lamp.

15. The apparatus according to claim 1, wherein said optical propagation means comprises:

a condensing means for condensing the light emitted by said light source;

an optical fiber receiving light condensed by said condensing means; and a focusing means for focusing, onto the workpiece, a light exiting said optical fiber.

16. The apparatus according to claim 1, wherein said detector is operable to receive light emitted from an emitting end of said optical propagation means and to detect an optical intensity of the light emitted from said emitting end of said optical propagation means.

17. The apparatus according to claim 1, wherein said detector is operable to receive the light condensed by said optical propagation means and to detect an optical intensity of the light condensed by said optical propagation means.

18. The apparatus according to claim 1, wherein said optical propagation means comprises an optical fiber for receiving light emitted from said light source, and said detector is operable to receive light at a light-receiving end of said optical fiber and to detect an optical intensity of the light at said light-receiving end of said optical fiber.

19. The apparatus according to claim 18, wherein said detector is operable to receive light at a center of said light-receiving end of said optical fiber.

* * * * *